US011524608B1

(12) United States Patent
Larner et al.

(10) Patent No.: US 11,524,608 B1
(45) Date of Patent: *Dec. 13, 2022

(54) MOVING SEATS IN A VEHICLE TO ENHANCE OCCUPANT PROTECTION

(71) Applicant: Waymo LLC, Mountain View, CA (US)

(72) Inventors: Daniel Lynn Larner, San Jose, CA (US); Courtney McCool, San Jose, CA (US); Thomas Daniel, San Francisco, CA (US); Atul Gupta, San Jose, CA (US); Felix Jose Alvarez Rivera, Tarzana, CA (US); Peter Craig Lombrozo, Santa Cruz, CA (US)

(73) Assignee: Waymo LLC, Mountain View, CA (US)

( * ) Notice: Subject to any disclaimer, the term of this patent is extended or adjusted under 35 U.S.C. 154(b) by 351 days.

This patent is subject to a terminal disclaimer.

(21) Appl. No.: 16/815,685

(22) Filed: Mar. 11, 2020

Related U.S. Application Data

(63) Continuation of application No. 15/219,580, filed on Jul. 26, 2016, now Pat. No. 10,611,269.

(51) Int. Cl.
*B60N 2/02* (2006.01)
*B60N 2/42* (2006.01)
(Continued)

(52) U.S. Cl.
CPC ............ *B60N 2/0276* (2013.01); *B60N 2/06* (2013.01); *B60N 2/14* (2013.01); *B60N 2/4207* (2013.01);
(Continued)

(58) Field of Classification Search
CPC .......... B60N 2/0276; B60N 2/06; B60N 2/14; B60N 2/4207; B60N 2/4228; B60N 2/427; B60N 2/42709; G05D 1/021
See application file for complete search history.

(56) References Cited

U.S. PATENT DOCUMENTS 6,592,166 B2    7/2003 Motozawa
7,124,851 B2   10/2006 Smith et al.
(Continued)

FOREIGN PATENT DOCUMENTS

DE   102011122384 A1      9/2012
EP       1065096 A1  *   1/2001
JP     2005225334 A  *   8/2005

*Primary Examiner* — Brian P Sweeney
(74) *Attorney, Agent, or Firm* — Botos Churchill IP Law

(57) ABSTRACT

The disclosure provides for a system. The system may include a rotational control system configured to rotate a seat of a vehicle, and one or more computing devices. The one or more computing devices may have one or more processors that are configured to determine that an impact is imminent at a location on the vehicle along a collision axis. A most favorable orientation may be determined by the one or more processors based on the determined location and collision axis. Using the rotational control system, the one or more processors may rotate the seat of the vehicle to the most favorable orientation in order to reduce risks of serious injury to a passenger in the seat caused by the imminent impact. A translational control system may be used by the one or more processors to translate the seat of the vehicle to a position relative to the determined location.

20 Claims, 15 Drawing Sheets

(51) Int. Cl.
*B60N 2/427* (2006.01)
*G05D 1/02* (2020.01)
*B60N 2/14* (2006.01)
*B60N 2/06* (2006.01)

(52) U.S. Cl.
CPC .......... *B60N 2/427* (2013.01); *B60N 2/4228* (2013.01); *B60N 2/42709* (2013.01); *G05D 1/021* (2013.01)

(56) References Cited

U.S. PATENT DOCUMENTS

| | | |
|---|---|---|
| 7,478,828 B2 | 1/2009 | Heuschmid et al. |
| 9,981,622 B2 | 5/2018 | Ohmura |
| 2001/0011830 A1 | 8/2001 | Nilsson |
| 2005/0240329 A1 | 10/2005 | Hirota |
| 2007/0080013 A1 | 4/2007 | Melz et al. |
| 2013/0300164 A1 | 11/2013 | Jonsson |

\* cited by examiner

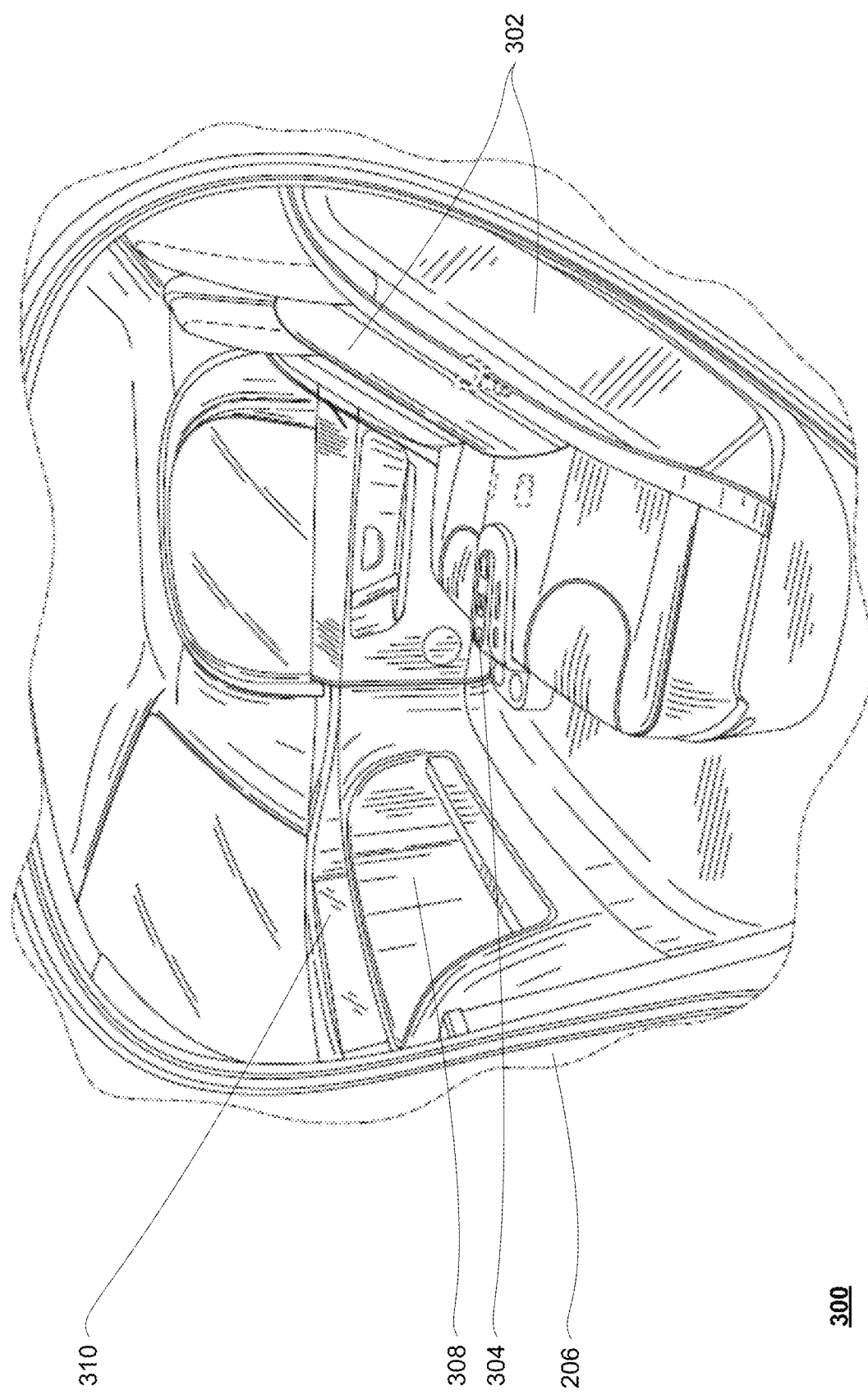

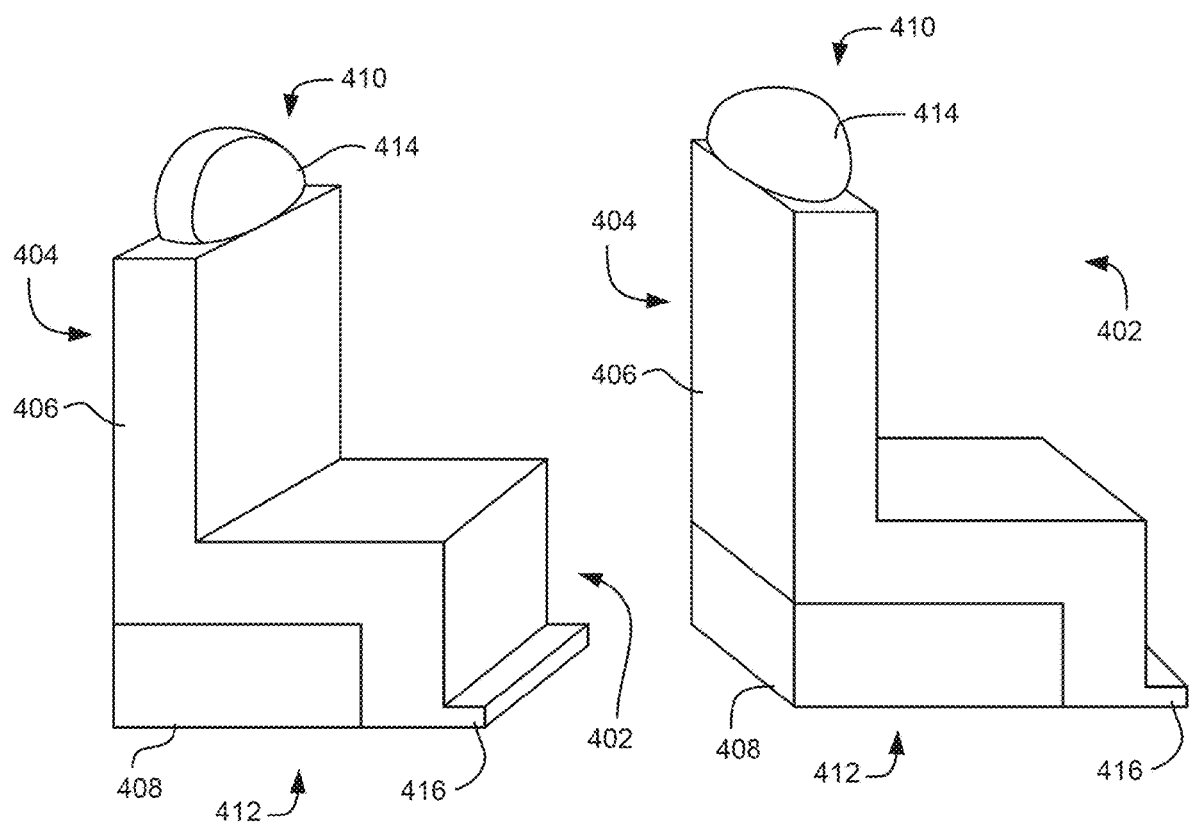
FIGURE 4A
FIGURE 4B
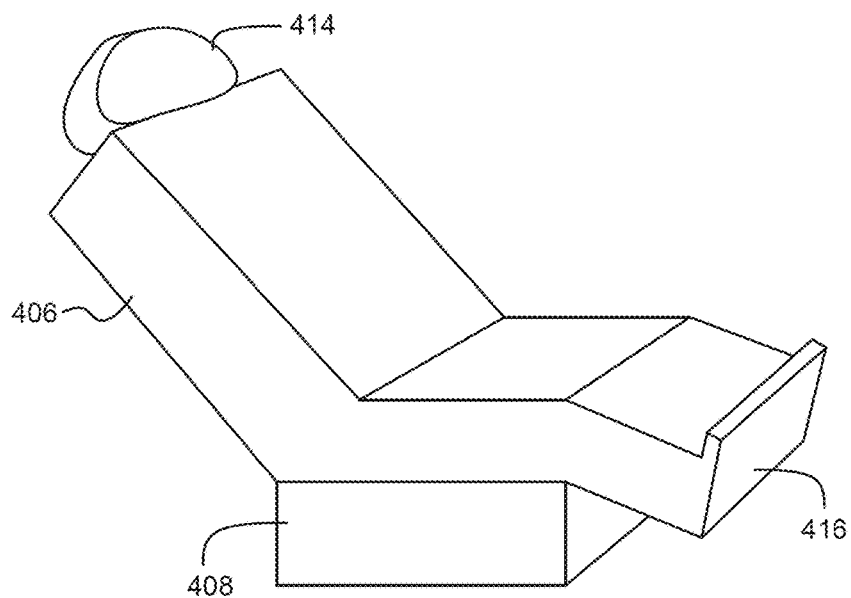
FIGURE 4C

MOVING SEATS IN A VEHICLE TO ENHANCE OCCUPANT PROTECTION

CROSS REFERENCE TO RELATED APPLICATIONS

The present application is a continuation of U.S. patent application Ser. No. 15/219,580, filed Jul. 26, 2016, the disclosure of which is incorporated herein by reference.

BACKGROUND

Autonomous vehicles, such as vehicles that do not require a human driver, can be used to aid in the transport of passengers or items from one location to another. Such vehicles may operate in a fully autonomous mode where occupants, or passengers, may provide some initial input, such as a pick up or destination location, and the vehicle maneuvers itself to that location.

An important component of an autonomous vehicle is the perception system, which allows the vehicle to perceive and interpret its surroundings using cameras, radar, sensors, and other similar devices. Data from the perception system is then used by the autonomous vehicle's computer to make numerous decisions while the autonomous vehicle is in motion, such as deciding when to speed up, slow down, stop, turn, etc. These decisions are used to maneuver between locations but also to interact with and avoid collisions with other objects along the way.

When a collision actually occurs, non-autonomous and autonomous vehicles alike may include various safety mechanism systems to reduce injury to passengers. For example, the safety mechanism systems may include airbag systems employed to protect passengers from impacts with the interior of a vehicle after an object external to a vehicle has impacted a bumper of the vehicle.

BRIEF SUMMARY

Aspects of the disclosure provide for a method that includes determining, by one or more computing devices, that an impact is imminent at a location on a vehicle along a collision axis; determining, by the one or more computing devices, a most favorable orientation of a seat in the vehicle based on the determined location and collision axis, the most favorable orientation being an angle to the collision axis at which there is at least one of (i) a least likelihood of injury to the passenger in the seat or (ii) a highest performance of personal restraint system; and rotating, by the one or more computing devices, the seat of the vehicle to the most favorable orientation in order to reduce risks of serious injury to a passenger in the seat upon impact.

In one example, the method also includes translating, by the one or more computing devices, the seat of the vehicle a distance away from the determined location prior to impact to reduce risks of serious injury to the passenger in the seat upon impact. In another example, the method also includes translating, by the one or more computing devices, the seat of the vehicle toward the determined location upon impact in order to reduce forces on the passenger in the seat caused by the imminent impact. In this example, the seat of the vehicle includes an energy absorption means configured to cause the seat to translate toward the determined location at a controlled rate upon impact.

In yet another example, the seat of the vehicle is configured to allow the passenger in the seat to translate along the collision axis independent from the seat of the vehicle. In this example, the seat includes a deformable material such that the passenger in the seat may translate during impact independent from the seat. In a further example, the most favorable orientation of the seat is an angle that is parallel to the collision axis with a front of the seat facing away from the determined location.

Other aspects of the disclosure provide for a system that includes a rotational control system configured to rotate a seat of a vehicle and one or more computing devices. The one or more computing devices has one or more processors configured to determine that an impact is imminent at a location on the vehicle along a collision axis; determine a most favorable orientation of the seat in the vehicle based on the determined location and collision axis, the most favorable orientation being an angle to the collision axis at which there is at least one of (i) a least likelihood of injury to the passenger in the seat or (ii) a highest performance of personal restraint system; and rotate, using the rotational control system, the seat of the vehicle to the most favorable orientation in order to reduce risks of serious injury to a passenger in the seat upon impact.

In one example, the system also includes a translational control system configured to translate the seat of the vehicle, wherein the one or more computing devices is also configured to translate, using the translational control system, the seat of the vehicle a distance away from the determined location prior to impact to reduce risks of serious injury to the passenger in the seat upon impact. In another example, the system also includes a translational control system configured to translate the seat of the vehicle, wherein the one or more computing devices is also configured to translate, using the translational control system, the seat of the vehicle toward the determined location upon impact in order to reduce forces on the passenger in the seat caused by the imminent impact. In this example, the seat of the vehicle comprises an energy absorption means configured to cause the seat to translate toward the determined location at a controlled rate upon impact.

In yet another example, the seat of the vehicle is configured to allow the passenger in the seat to translate along the collision axis independent from the seat of the vehicle. In this example, the seat includes a deformable material such that the passenger in the seat may translate during impact independent from the seat. In a further example, the most favorable orientation of the seat is an angle that is parallel to the collision axis with a front of the seat facing away from the determined location.

In another example, the system also includes the vehicle. In this example, the vehicle is capable of operating autonomously.

Further aspects of the disclosure provide for a non-transitory, computer-readable medium on which instructions are stored. The instructions, when executed by one or more computing devices, causes the one or more computing devices to perform a method. The method includes determining that an impact is imminent at a location on a vehicle along a collision axis; determining a most favorable orientation of a seat in the vehicle based on the determined location and collision axis, the most favorable orientation being an angle to the collision axis at which there is at least one of (i) a least likelihood of injury to the passenger in the seat or (ii) a highest performance of personal restraint system; and rotating the seat of the vehicle to the most favorable orientation in order to reduce risks of serious injury to a passenger in the seat upon impact.

In one example, the method also includes translating the seat of the vehicle a distance away from the determined location prior to impact to reduce risks of serious injury to the passenger in the seat upon impact. In another example, the method also includes translating the seat of the vehicle toward the determined location upon impact in order to reduce forces on the passenger in the seat caused by the imminent impact. In this example, the seat of the vehicle includes an energy absorption means configured to cause the seat to translate toward the determined location at a controlled rate upon impact.

BRIEF DESCRIPTION OF THE DRAWINGS

FIG. 3 is an example internal view of a vehicle in accordance with aspects of the disclosure.

FIGS. 4A-4C are views of an example seat in accordance with aspects of the disclosure.

DETAILED DESCRIPTION

Overview

The technology relates to translating and rotating seats within the vehicle in a controlled fashion depending on the parameters of an imminent impact. While avoiding collisions with other objects is a primary goal for autonomous vehicles, in rare circumstances, there may be an imminent and unavoidable impact. In other words, the vehicle's computing devices may determine that an impact cannot be avoided by way of braking, steering, or accelerating the vehicle. When this is the case, an autonomous vehicle's computing devices may work to move the seats of the autonomous vehicle in order to absorb energy from the crash and increase the time over which the passenger experiences the forces of the crash. As such, translating and rotating vehicle seats may reduce and dampen the peak impulse the passenger would have otherwise experienced. This, in turn, may reduce the amount of injury to a passenger in the event of a collision.

In response to a determination that an impact is imminent, the vehicle's computing devices may activate a rotational control system to rotate a seat of the vehicle to a most favorable orientation. The most favorable orientation may be an angle to the collision axis at which there is a least likelihood of injury to the passenger in the seat and/or at which personal restraint systems provides highest performance. Additionally or alternatively, the vehicle's computing devices may activate a translational control system to move the seat of the vehicle a farther distance away from the determined location before impact. The seat may be moved by the translational control system towards the middle of the vehicle, away from an intruding structure. The translation of the seat may be along a track on which the base of the seat is configured to slide.

Upon impact, the vehicle's computing devices may continue to use the translational control system to move the seat away from the determined location to reduce the velocity of the seat in relation to the object impacting the vehicle. The translational control system may also be used to translate the seat of the vehicle at a controlled rate upon impact along the collision axis and toward the determined location of impact. To control the rate of translation of the seat upon impact, the translational control system may include one or more means of energy dissipation or absorption to dampen the acceleration of the seat due to the impact. An amount of desired energy absorption may be based on an estimated speed of impact and/or an estimated force of impact.

In addition, as discussed in detail below, the features described herein allow for various alternatives.

Example Systems

Figure 1:
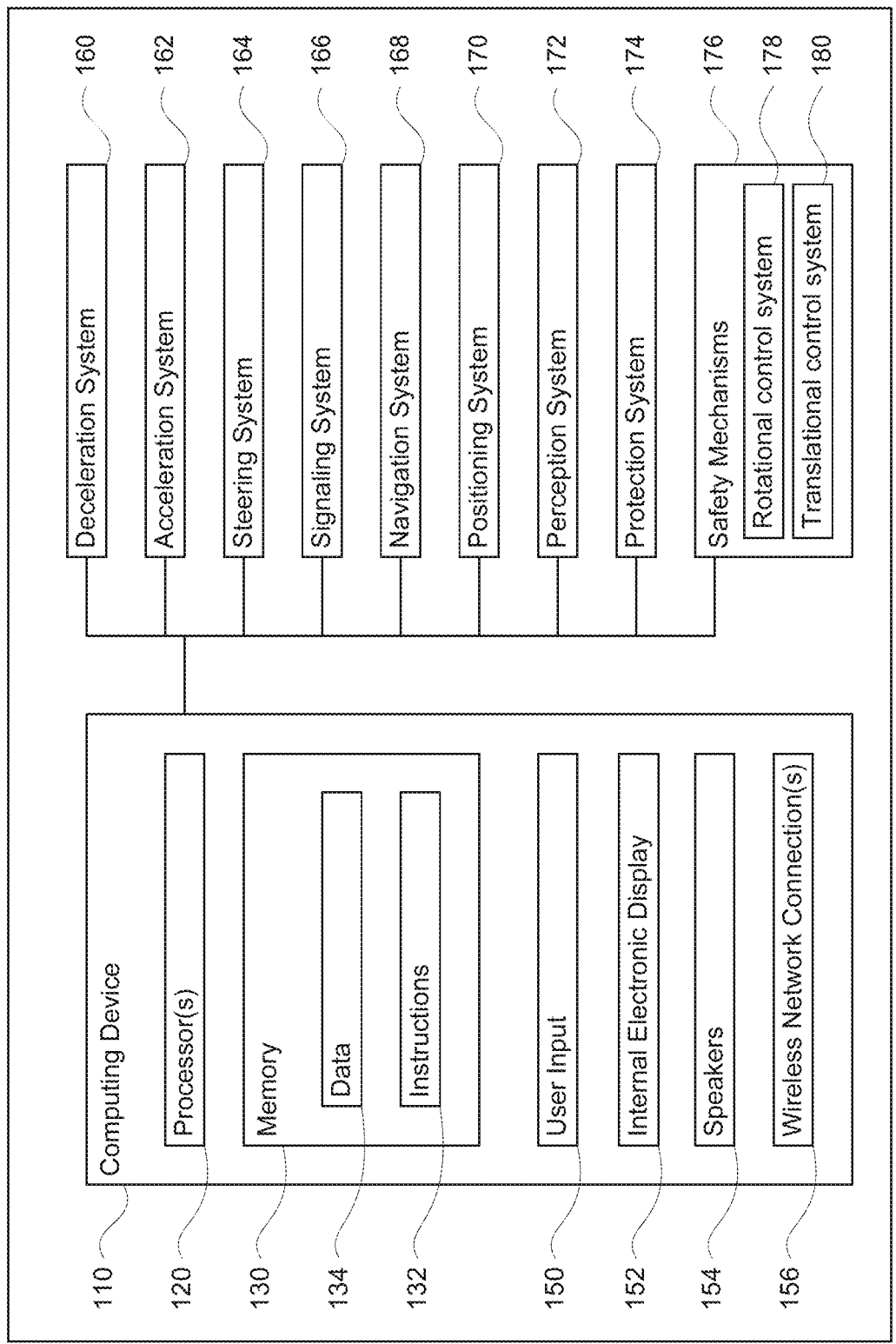
FIG. 1 is a functional diagram of an example vehicle in accordance with aspects of the disclosure.
Figure 2A:
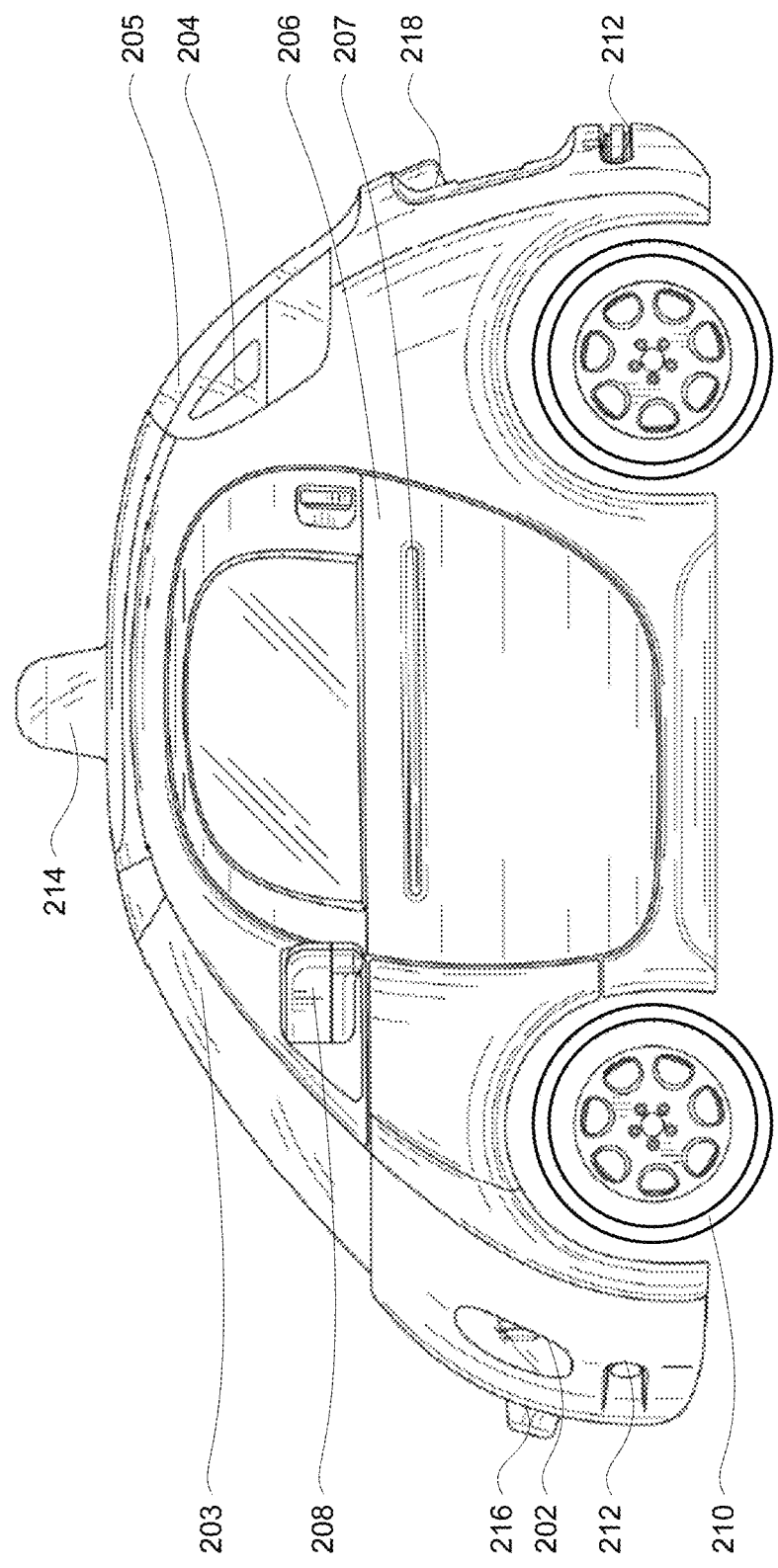
FIGS. 2A-2D are example external views of a vehicle in accordance with aspects of the disclosure.
Figure 2C:
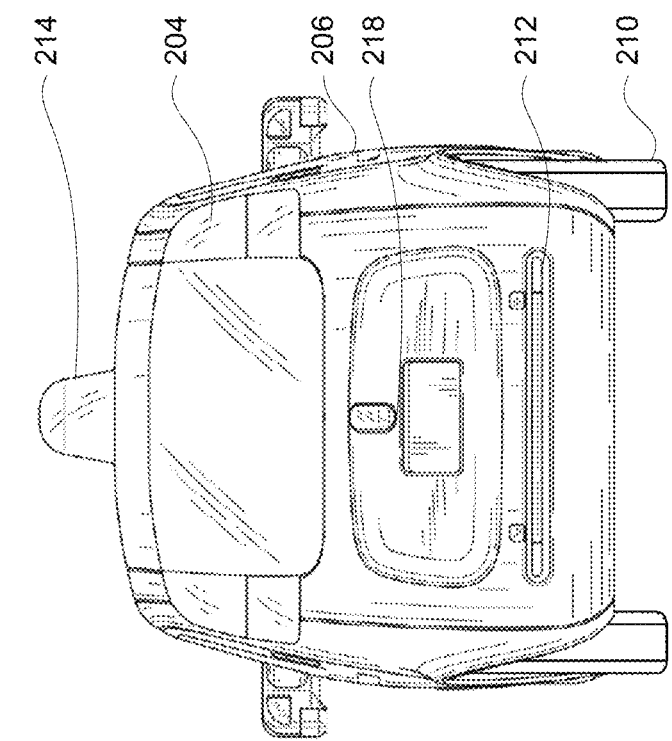
Figure 2B:
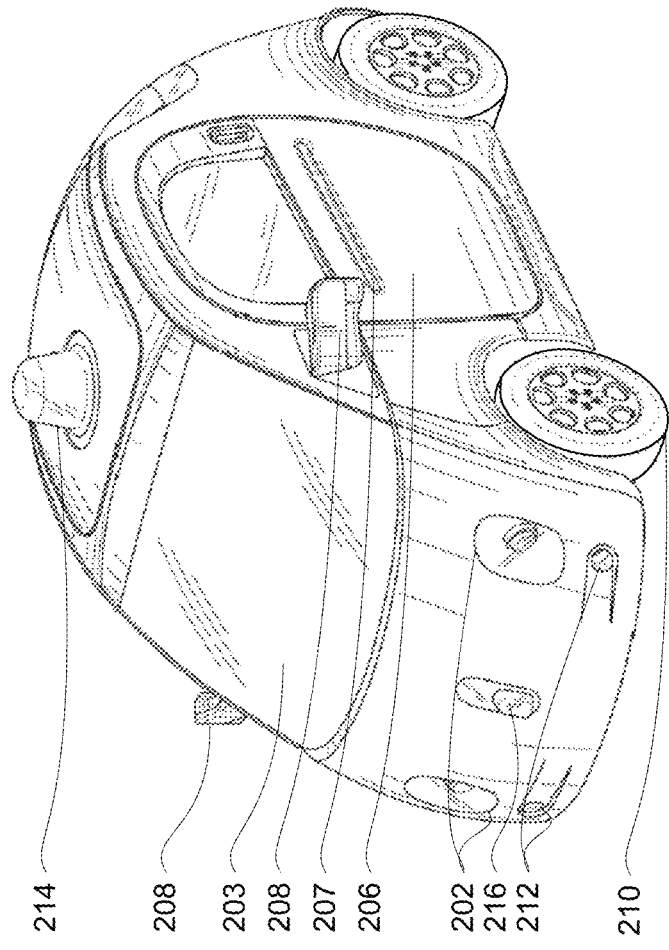
Figure 2D:
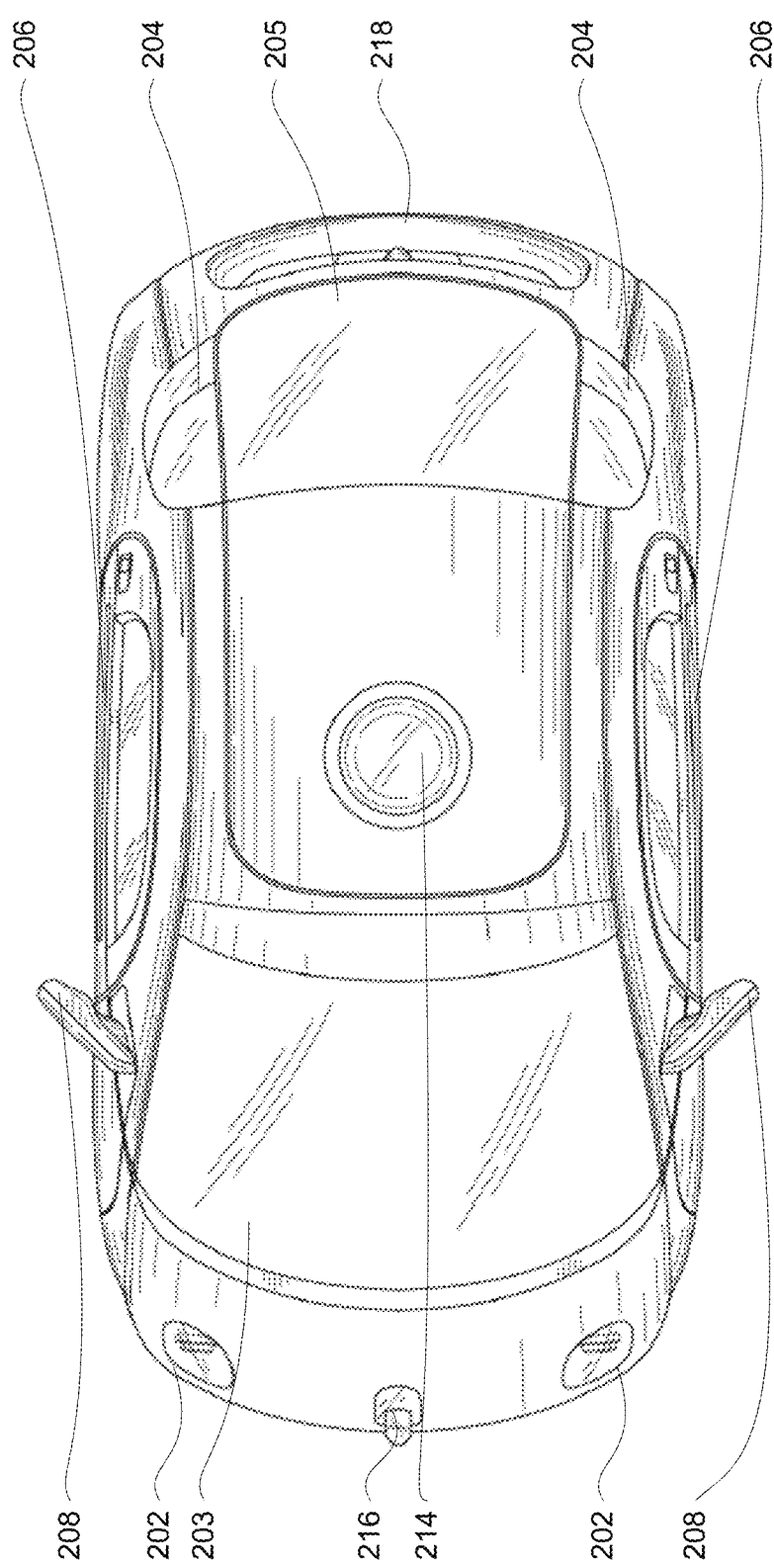

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 154 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may be capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and perception system 172, and protection system 174 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100. As with the computing device 110, each of these systems may also include one or more processors as well as memory storing data and instructions as with processors 120, memory 130, data 132 and instructions 134.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than the absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 170 may include lasers, sonar, radar, cameras and/or any other detection devices that record data which may be processed by computing device 110. In the case where the vehicle is a small passenger vehicle such as a car, the car may include a laser 214 (shown in FIGS. 2A-2D) or other sensors mounted on the roof or other convenient location. In some vehicles, the perception system 172 may also include pressure transducers inside a vehicle structure configured to detect whether the vehicle structure is being compressed.

These sensors of perception system 172 may detect objects in the vehicle's environment as well as characteristics of those objects such as their location, heading, size (length height and width), type, and approximate center of gravity. For example, the perception system may use the height of an object identified as a pedestrian (or human) to estimate the approximate center of gravity of the object. In this regard, the perception system may compare the characteristics of the object to known anthropomorphic data to determine an approximate center of gravity. For other object types, the approximate center of gravity may be determined from the characteristics of the object using various known statistical analyses. Data and information required for these determinations may be stored, for example, in memory 130 or a different memory of the perception system.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computing device 110 may also control the drivetrain of the vehicle in order to maneuver the vehicle autonomously.

As discussed in more detail below, information from the perception system may be sent to various other systems in order to make decisions about when and how to deploy various safety mechanisms. In this regard, the perception system may send the information to the vehicle's computing devices which make such decisions and forward activation instructions to protection system 174 which deploys one or more safety mechanisms 176 in accordance with the activation instructions. In another example, the perception system 172 may forward the information directly to the protection system 174 which then determines whether and how to deploy one or more safety mechanisms 176.

Thus, the vehicle may also include a plurality of safety mechanisms 176. These safety mechanisms may be configured to reduce the likelihood of damage to objects outside of the vehicle as opposed to those meant to specifically protect passengers inside the vehicle. At least some of these safety mechanisms may be active, in that the device must be activated or deployed by a signal generated by one or more computing devices when an impact is imminent.

FIGS. 2A-2D are examples of external views of vehicle 100. As can be seen, vehicle 100 includes many features of a typical vehicle such as headlights 202, windshield 203, taillights/turn signal lights 204, rear windshield 205, doors 206, side view mirrors 208, tires and wheels 210, and turn signal/parking lights 212. Headlights 202, taillights/turn signal lights 202, and turn signal/parking lights 212 may be associated the signaling system 166. Light bar 207 may also be associated with the signaling system 166.

FIG. 3 is an example internal view of vehicle 100 through the opening of door 206. In this example, there is of a row of two seats 302 for passengers with a console 304 between them. Directly in ahead of seats 302 is a dashboard configuration 306 having a storage bin area 308 and the internal electronic display 310. As can be readily seen, the vehicle does not include a steering wheel, gas (acceleration) pedal, or brake (deceleration) pedal which would allow for a semiautonomous or manual driving mode where a passenger would directly control the steering, acceleration and/or deceleration of the vehicle via the drivetrain. Rather, user input is limited to a microphone (not shown), features of the console 304, and wireless network connections in vehicle 101. In this regard, internal electronic display 310 merely provides information to the passenger and need not include a touch screen or other interface for user input. In other embodiments, the internal electronic display 310 may include a touch screen or other user input device for entering information by a passenger such as a destination, etc.

In certain implementations, one or more seats in the vehicle may be configured as shown in FIGS. 4A-4C. A seat 400 may have a front end 402 and a back end 404. The back end 404 may comprise a back support 406 extending upward from the back end of a base 408 of the seat. Also, the seat may have a top end 410 and a bottom end 412. The top end 410 may be the top of the back support 406 and may include a head rest 414, and the bottom end 412 may be the bottom of the base 408 of the seat and may include a foot rest 416. When a passenger is seated in the seat, he or she may have his or her back in contact with the back support 406 and be facing the front end 402 of the seat with his or her legs arranged over the front end of the base 408. The passenger's feet may be in contact with the foot rest 416. Further, as shown in FIG. 4C, the seat 400 may be capable of reclining at an angled or completely flat position. As discussed in detail below, the seat 400 of vehicle 100 may be configured to translate and/or rotate within the vehicle.

Figure 5:
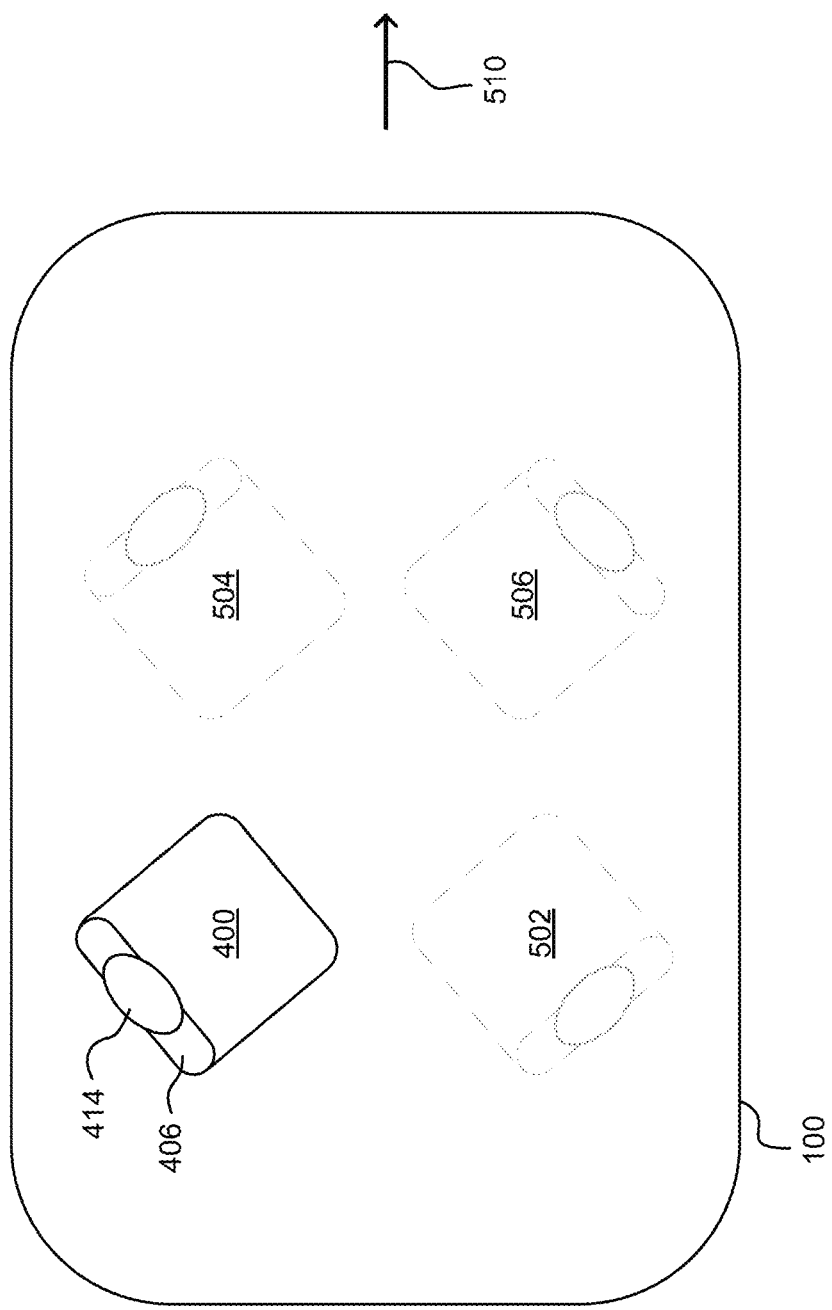
FIG. 5 is an example top-down view of seats in a vehicle in accordance with aspects of the disclosure.

When the vehicle is in operation, one or more seats of the vehicle may be positioned in a non-traditional arrangement. For example, as shown in FIG. 5, seats 400, 502, 504, and 506 may be positioned in a circle facing each other in vehicle 100 while vehicle 100 is traveling in direction of arrow 510. Seats 400, 502, 504, and 506 are all not facing the direction of arrow 510 in which vehicle 100 is traveling.

The one or more safety mechanisms 176 may include one or more control systems configured to control one or more seats in the vehicle 100. The one or more control systems may include a rotational control system 178. The rotational control system 178 may be configured to rotate the seat 400 about a vertical axis attached at the base 408 of the seat, or the yaw axis of the seat. By rotating about the vertical axis, the rotational control system 178 may change the direction the seat faces. The rotational control system 178 may also be configured to rotate the seat 400 about a longitudinal, and/or roll, axis, which means being able to tilt the seat to one side or the other. Further, the rotational control system 178 may be configured to rotate the seat 400 about a lateral, or pitch, axis, which means being able to tilt the seat forward or backward. Being configured to rotate the seat about the lateral axis may also mean being able to tilt the back support of the seat forward or backward independent from the base of the seat. Therefore, if a seat is reclined with the back support of the seat angled back, such as in FIG. 4C, the rotational control system 178 may rotate the back support to an upright position, such in FIGS. 4A and 4B.

The one or more control systems may also include a translational control system 180. The translational control system 180 may include an active actuator, such as a linear motor or a pyro-based gas pressure, configured to move the seat 400 along tracks or guide rails in the vehicle. The translation of the seat may be along a track on which the base of the seat is configured to slide.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
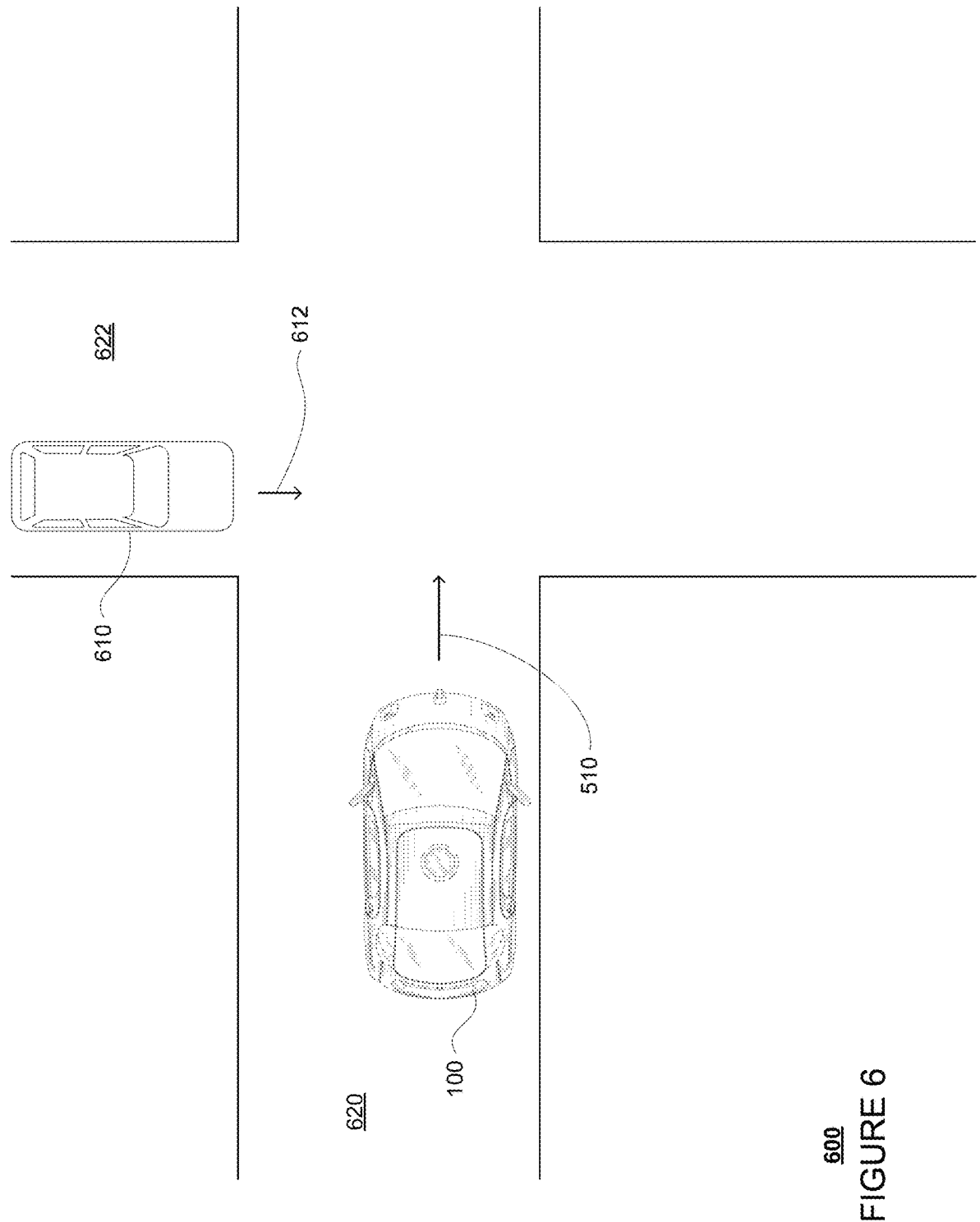
FIG. 6 is an example situational diagram in accordance with aspects of the disclosure.

Prior to deploying the safety mechanisms, vehicle's computing devices may use information from the vehicle's sensors to identify and track objects in the vehicle's environment. For example, one or more computing devices of the perception system may use information form the vehicle's sensors to detect and identify the characteristics (size, speed, shape, direction, object type, etc.) of various objects in the vehicle's environment. FIG. 6 is an example 600 bird's eye view of vehicle 100 as it drives along roadway 620 in the direction of arrow 510. In this example, the one or more computing devices of the perception system 172 may identify, among other things, the location and object type of vehicle 610. After a brief period of tracking this object, the perception system 172 may determine the speed and heading of vehicle 610 as shown by arrow 612. Accordingly, the perception system 172 may determine that vehicle 610 is traveling along roadway 622, which runs perpendicular to roadway 620.

Figure 7:
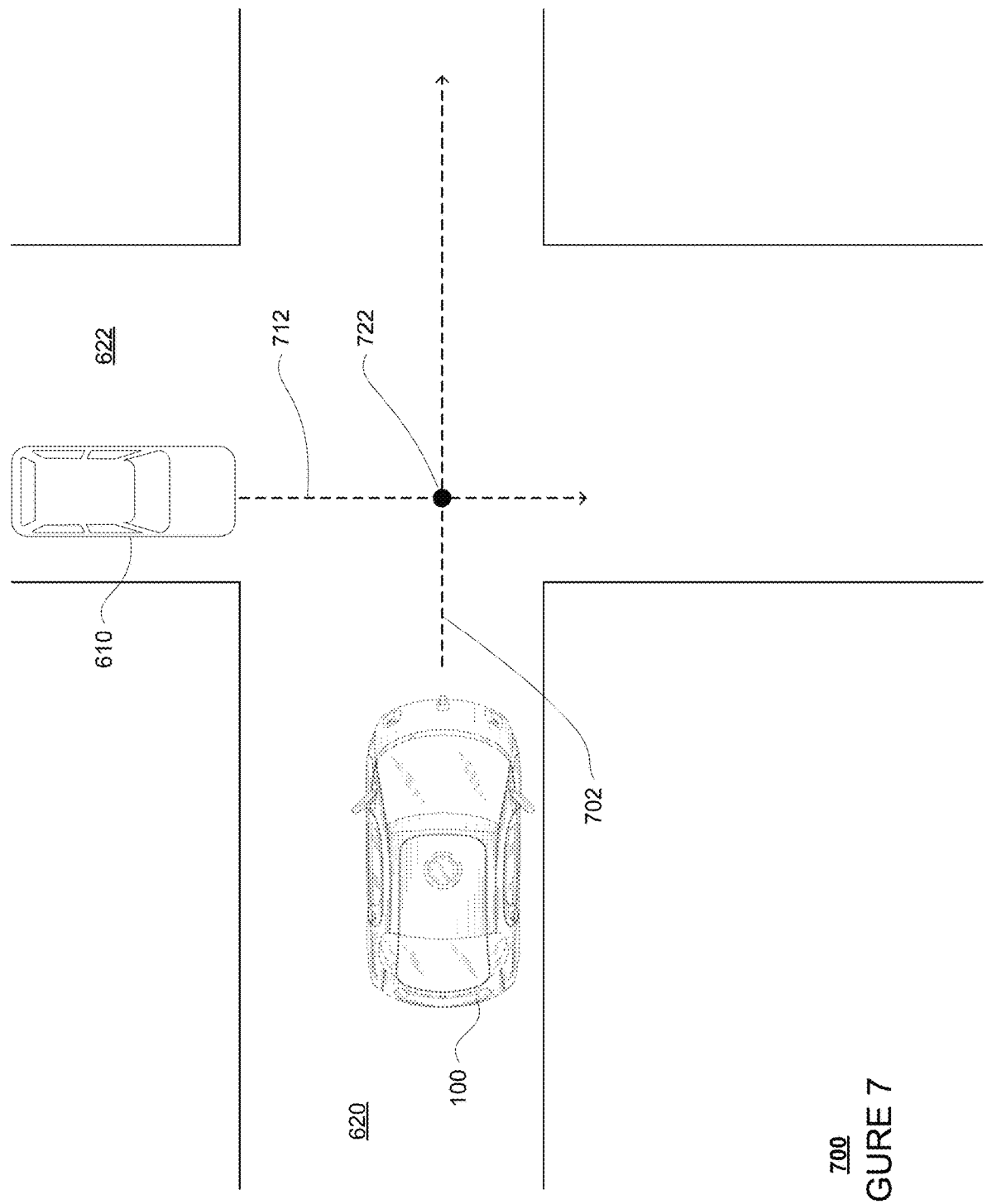
FIG. 7 is another example situational diagram in accordance with aspects of the disclosure.

In addition, the vehicle's computing devices may use the characteristics of the object, such as speed and heading, to predict future locations where the object will be. For example, as shown in example 700 of FIG. 7, trajectory lines 702 and 712 represent predicted future locations of vehicle 100 and vehicle 610, respectively. Because the predicted future locations of these objects are just that, predictions, predictions may quickly become less accurate the farther into the future they become.

The vehicle's computing devices may also determine whether the future locations indicate that the vehicle will collide with the object. For example, the perception system 172 or computing device 110 may determine that an impact with vehicle 610 is likely to occur at the locations of predicted impact point 722, respectively. Each of these impact points may be defined as a three-dimensional coordinate (X, Y, Z) in space such as latitude, longitude, and altitude or similar.

In most cases, if a collision is likely, the vehicle's computing devices may maneuver the vehicle in order to avoid the object. For example, computing device 110 may use the steering, acceleration and deceleration systems to maneuver vehicle 100 out of the path of vehicle 610.

However if there is not enough time to avoid the object, (i.e. not enough distance, not enough braking power, not enough room to go around or avoid etc.) the vehicle's computing devices may determine that an impact with the object is imminent. For example, an impact may be imminent, when an impact is predicted to occur within a predetermined period of time, such as a few seconds or more or less. When an impact is imminent, the vehicle's computing devices may send a signal to the protection system 174 in order to deploy one or more of the active safety mechanisms. For example, the vehicle's computing devices 110 may determine that the vehicle will not be able to safely maneuver out of the way in order to avoid vehicle 610 before both vehicles 100 and 610 reach impact point 722.

Where a vehicle's computing devices are able to determine that an impact is imminent, the vehicle's computing devices may work to move seats of the vehicle in advance of the impact.

Figure 8:
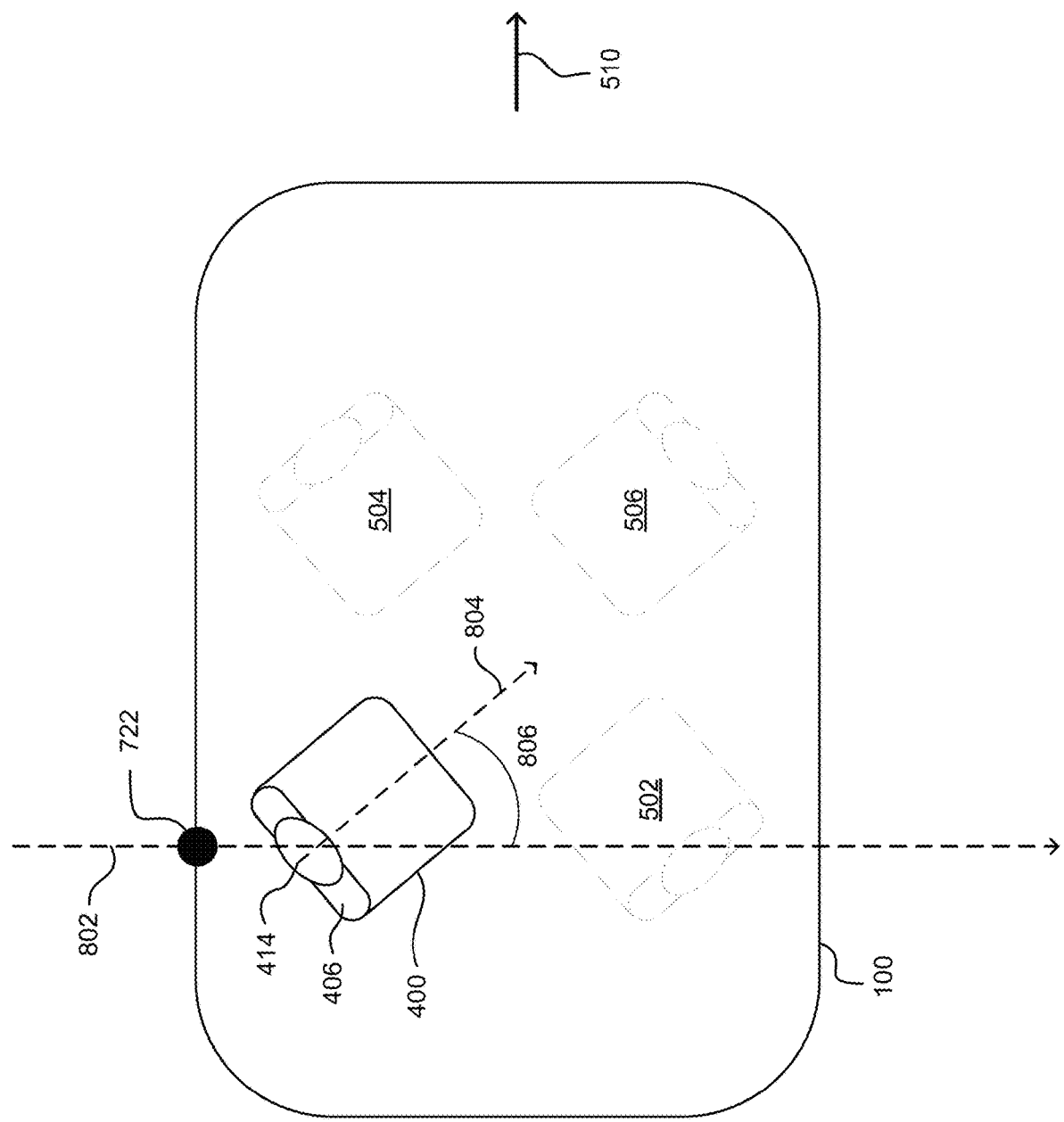
FIG. 8 is another example top-down view of seats in a vehicle in accordance with aspects of the disclosure.

A location of impact on the vehicle and a collision axis may be determined based on the predicted trajectories of the object and the vehicle. The location of impact may be a side of the vehicle, such as the front, the driver side, the passenger side, and the rear. The collision axis may be based on an estimated angle of impact of the object with the location of the vehicle. The information from the vehicle's sensors may be used for the determination of the location of impact and the collision axis. For example, as depicted in FIG. 8, vehicle 610 is projected to "T-bone" vehicle 100 on the driver side of vehicle 100. The impact point 722 of vehicle 610 on vehicle 100 is projected to be located on the rear driver side door of vehicle 100. The collision axis 802 is projected to be perpendicular to the direction of travel, represented by arrow 510, of vehicle 100.

In response to determining the location of impact and the collision axis, the vehicle's computing devices may activate a rotational control system to rotate a seat of the vehicle to a most favorable orientation. The rotational control system may include an actuator, such as a pyro-actuator that is configured to unlock and rotate the seat to a fixed position. The most favorable orientation may be an angle to the collision axis at which there is a least likelihood of injury to the passenger in the seat and/or at which personal restraint systems perform best. The most favorable orientation may also take into account positions of other passengers, seats, or other objects within the vehicle in order to reduce any secondary impacts with persons or objects within the vehicle. In some systems, the most favorable orientation may be forward-facing in the vehicle so that a passenger is sitting upright and fully facing an airbag upon impact. For these systems, when impact is determined to be imminent, the rotational control system may rotate a seat of the vehicle to a position in front of an airbag and facing the airbag in an upright position. In other systems, the most favorable orientation may be parallel to the collision axis with the front of the seat facing away from the determined location of impact. In other words, for these other systems, the seat may be rotated so that the back of the seat is upright and faces the determined location and thus is positioned between the determined location of impact and a passenger in the seat. Alternatively, the seat may be rotated so that the back of the seat is parallel to the floor of the vehicle, and the base of the seat is positioned between the determined location of impact and a passenger in the seat.

Figure 9:
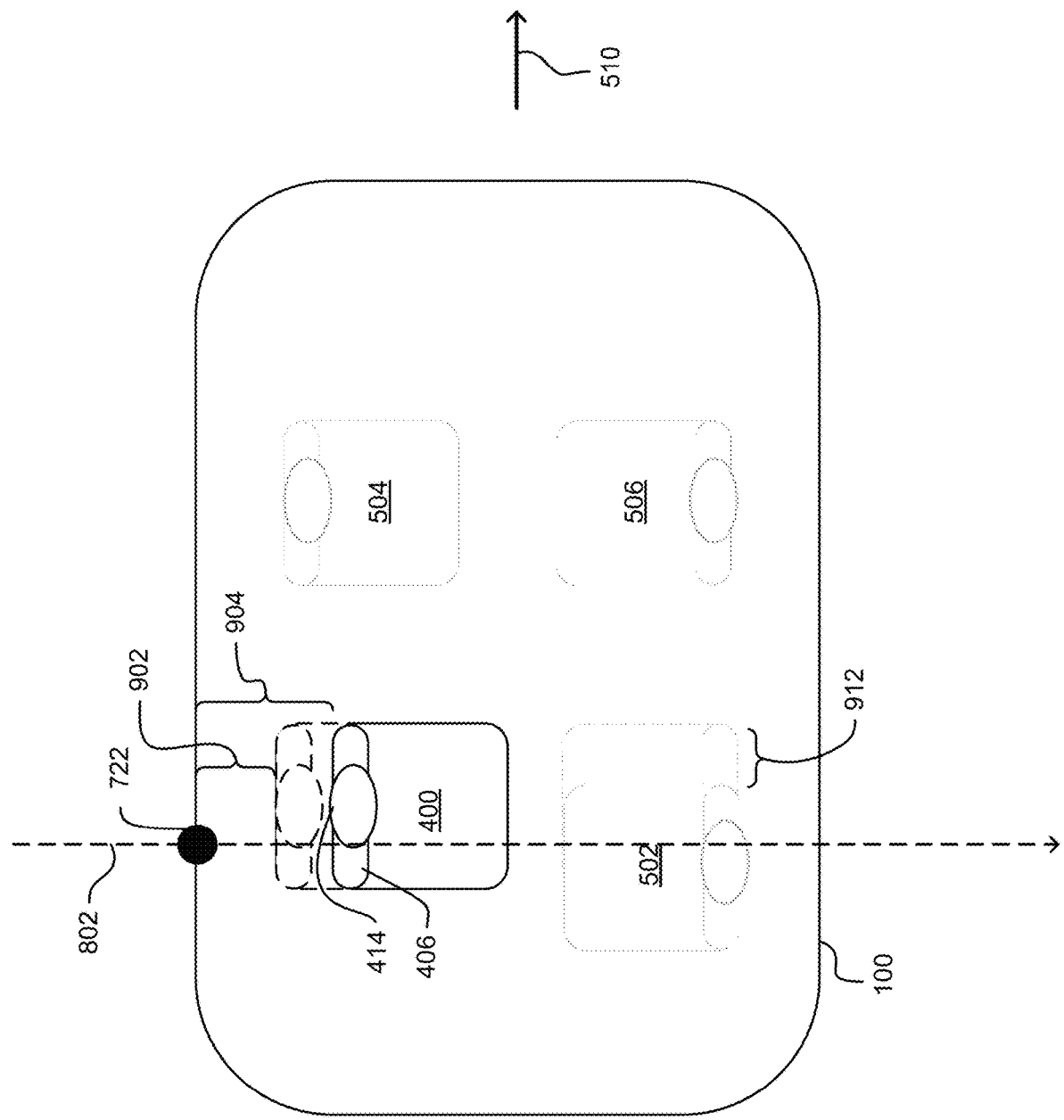
FIG. 9 is yet another example top-down view of seats in a vehicle in accordance with aspects of the disclosure.
Figure 10:
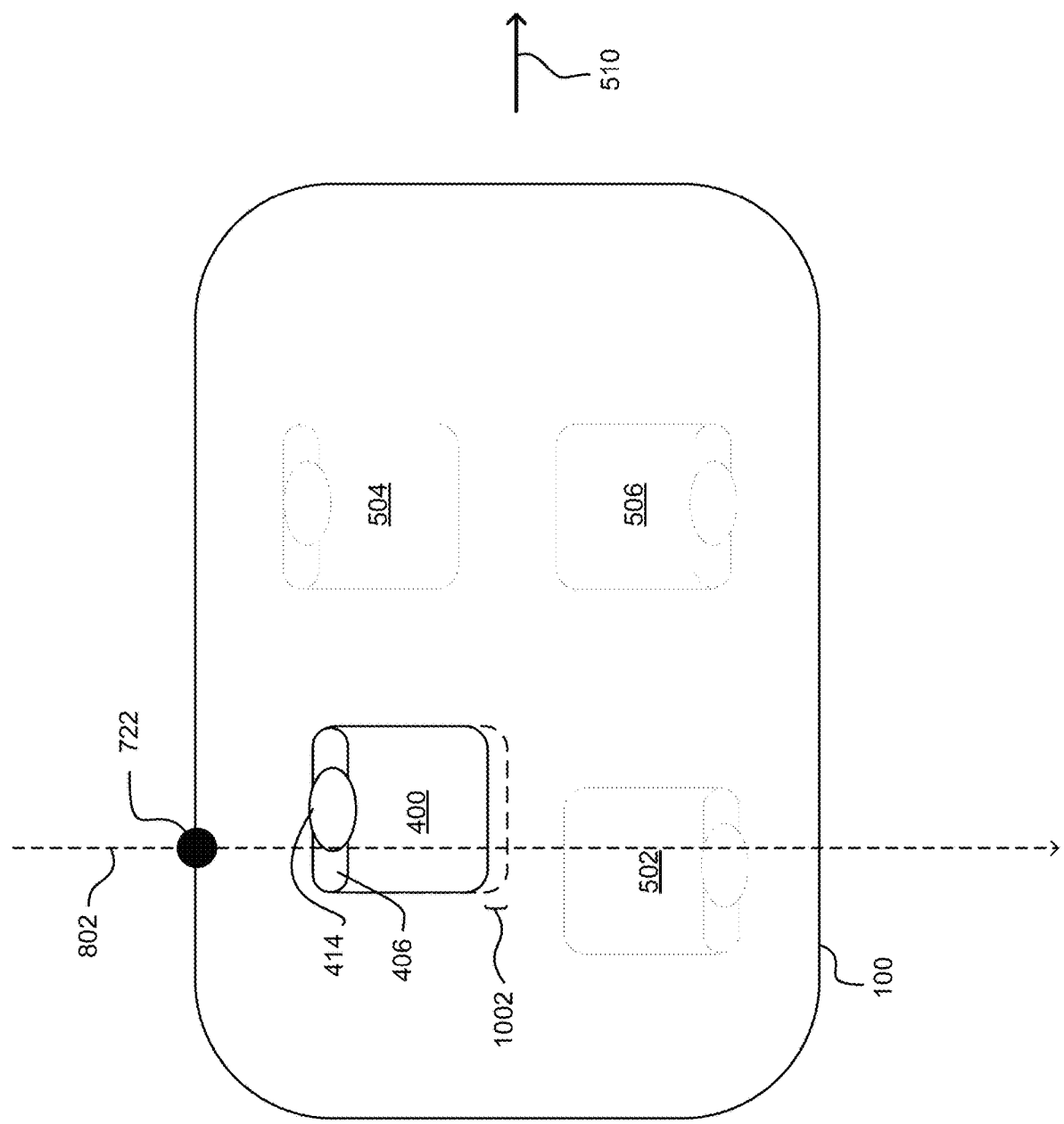
FIG. 10 is a further example top-down view of seats in a vehicle in accordance with aspects of the disclosure.

Seat 400 of vehicle 100 is initially positioned near the rear driver side door of vehicle 100 and facing a direction of arrow 804. Seat 400 is therefore positioned at an angle 806 to the collision axis 802. Once the impact location 722 at the rear driver side door and the collision axis 802 are determined, the rotational control system 178 of vehicle 100 is activated to rotate seat 400 to be more or less parallel to collision axis 802, or to face directly away from the rear driver side door of vehicle 100, as shown in FIG. 9. In this position, the back support 406 of seat 400 is in an upright position between a passenger in seat 400 and the impact point 722. Seats 502, 504, 506 may also be rotated to be more or less parallel to collision axis 802 in anticipation of impact.

Additionally or alternatively, the vehicle's computing devices may activate a translational control system to move the seat of the vehicle a farther distance away from the determined location before impact. In other words, the seat of the vehicle may be moved away from a danger zone where more serious injury to a passenger may likely occur due to vehicle intrusion and/or inertial forces and may experience less crash energy since there may be more time for other parts of the vehicle to absorb some of the crash energy. The seat may be moved by the translational control system towards the middle of the vehicle. For example, the seat 400 is positioned by the rear driver side door at a distance 902, such as three (3) inches or more or less. When it is determined that there may be imminent impact at impact location 722 on vehicle 100, the translational control system 180 is activated to move seat 400 to a distance 904 from the rear driver side door that is a farther distance than distance 902, such as six (6) inches or more or less.

The translational control system may also be activated prior to impact to move the seat of the vehicle away from other persons or objects in the vehicle in order to reduce secondary impacts. In particular, the translational control system may move the seat of the vehicle farther away from another seat and/or out of the way from a predicted trajectory of another seat. For example, a collision at impact point 722 of vehicle 100 is likely to cause seat 400 to accelerate in the direction of seat 502, which is positioned near seat 400 opposite the rear driver side door. Therefore, when it is determined that there may be imminent impact at impact point 722, seat 502 is translated toward the back of the cabin of vehicle 100. In this way, seat 502 is moved farther away from seat 400 and out of the way of the predicted trajectory of seat 400.

During impact, the vehicle's computing devices may also continue to use the translational control system to move the seat away from the determined location. Moving the seat during impact away from the determined location of impact may reduce the velocity of the seat in relation to the object impacting the vehicle. As a result, the seat of the vehicle may experience less acceleration due to the impact. In addition, the seat may also experience less crash energy since there may be more time for other parts of the vehicle to absorb crash energy.

The vehicle's computing devices may also activate a translational control system to translate the seat of the vehicle at a controlled rate upon impact. The seat may be translated along the collision axis and toward the determined location of impact. In vehicle 100, the translational control system 180 moves seat 400 a distance 1002, for example three (3) inches, in the direction of the impact point after vehicle 610 collides with vehicle 100. The translation of the seat may be along a guide rail on which the base of the seat is configured to slide. To control the rate of translation of the seat upon impact, the translational control system may include a means of energy dissipation or absorption. The translational control system may also determine an amount of desired energy absorption based on an estimated speed of impact and/or an estimated force of impact.

For example, the guide rail may include a viscous fluid damper which translates a fluid as the seat is translated along the guide in order to absorb some energy. Translating the fluid may be forcing the fluid through an orifice where the size of the orifice may be controlled according to a desired amount of energy absorption. In another example, prior to impact, the guide rail may be filled with a deformable material, e.g. pellets, such that the deformable material is crushed as the seat is translated in order to absorb some energy. An amount and density of deformable material may be controlled by a pyro-actuated piston or an inflator according to a desired amount of energy absorption. Furthermore, brakes of the base of the seat on the guide rail may be engaged in order to absorb some energy. An amount of pressure to apply on the brakes may be controlled according to a desired amount of energy absorption. Using one or more of the aforementioned means or any known means of energy dissipation or absorption, some crash energy may be absorbed thereby damping the translation of the seat.

In alternate examples, the vehicle's computing devices may activate the translational control system to move the seat of the vehicle in relation to a passenger in the seat as a means of positioning the passenger in the seat for increased safety. A preferred position for safety of a passenger may be where the passenger is in firm contact with the seat and/or other safety mechanisms, such as a seat belt pre-tensioning device, are able to perform more effectively. For example, returning to FIG. 4, a passenger may be sitting or leaning forward in the seat 400, and the translational control system may move in the direction of the passenger in order to have the passenger's back in full contact with the back support 406 of the seat and the passenger's head in contact with the head rest 414 of the seat. In some implementations, translation of the seat away from a location of impact as described previously and translation of the seat in relation to the passenger may be accomplished together in one movement of the seat.

The translational control system may further be configured to move the seat upward or downward in the vehicle. For example, base 408 of seat 400 may be configured to move up or down in relation to the vehicle's cabin, or may be of deflatable or inflatable material. The vehicle's computing devices may therefore activate the translational control system before impact to drop the seat downward. The seat may be dropped at a rate at which a passenger's spinal column may become extended. When the spinal column is extended, the spinal ligaments may be stretched and therefore have some tension, or stress. Upon impact, the extended spinal column may experience less severe lateral motion and shear gradient than a resting spinal column due to the pre-stressed ligaments. The shear gradient at impact may be reduced due to the increased spacing between neighboring vertebral foramen in the spinal column.

Figure 11:
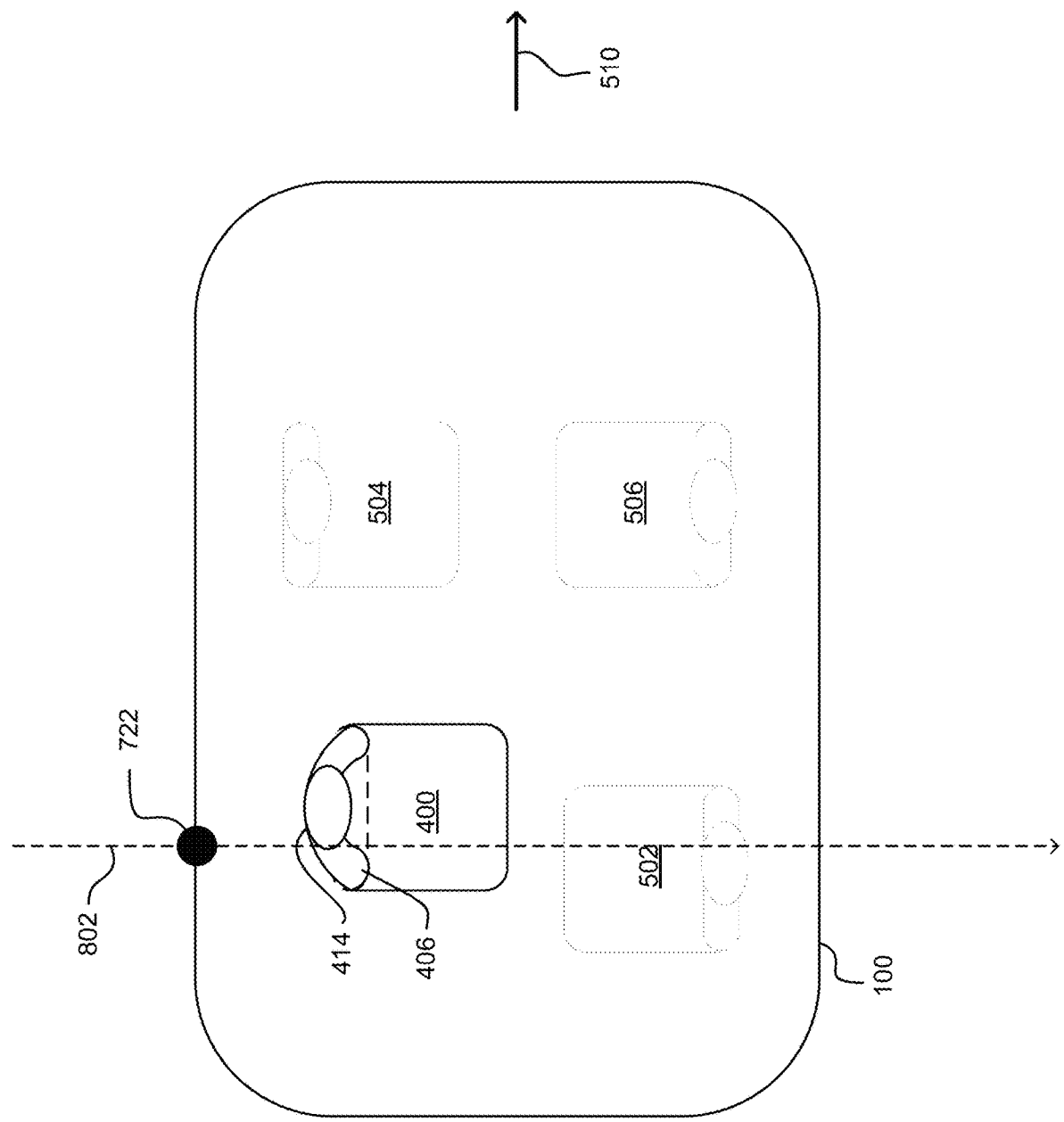
FIG. 11 is another example top-down view of seats in a vehicle in accordance with aspects of the disclosure.

During impact, the seat may be deformable such that a passenger in the seat may translate independent from the seat. The seat may be deformable under load due to the nature of the materials of which the seat is made, such as viscoelastic materials or crushable foams. In other examples, the seat may be configured to deform using layers of fabric with seams that are able to be torn under load. The seat may further be configured to deploy an energy-absorbing system, such as an airbag, before impact that is deformable upon impact. During impact, the seat may be deformed by stretching, softening, compressing, expanding, tearing, buckling, etc. so that a passenger in the seat may translate along a collision axis toward the determined location of impact. For example, upon impact at impact point 722, and seat 400 is rotated to have back support 406 between impact point 722 and a passenger in seat 400, the back of the seat, including back support 406, may stretch to dampen the acceleration of the passenger toward the location of impact, as shown in FIG. 11. The passenger may therefore sink into the back of the seat.

Figure 12:
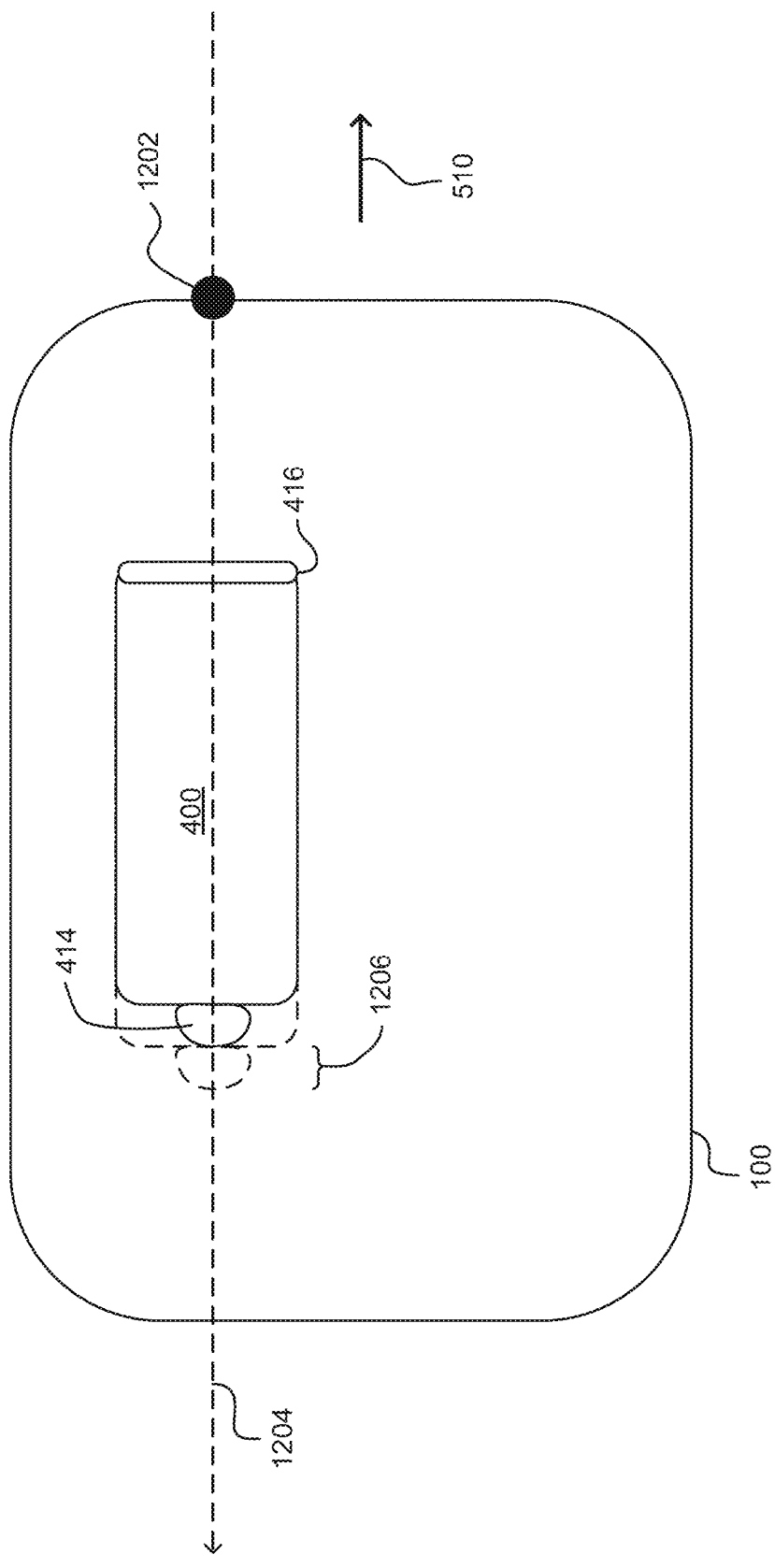
FIG. 12 is yet another example top-down view of seats in a vehicle in accordance with aspects of the disclosure.

In further examples, a seat may be adjustable to a reclined or flat position so that a passenger may be lying back or lying down in the vehicle. In this example, the most favorable orientation for a reclined or flat seat may be that the axis along the top end and the bottom end of the seat is in a plane parallel to the collision axis. The seat may additionally be configured to translate along the top-bottom axis upon impact in order to absorb some crash energy. As shown in FIG. 12, vehicle 100 that is travelling in direction of arrow 510 is projected to collide with vehicle 610 at impact point 1202. The collision axis is therefore along arrow 1204, lengthwise across vehicle 100. Vehicle 100 includes seat 400 that is in a flat position. Before impact, seat 400 is moved into a position by rotational control system 178 and/or translational control system 180 where foot rest 416 is between impact point 1202 and a passenger in seat 400. Upon impact, translational control system 180 is used to move seat 400 in the direction of impact point 1202 a distance 1206, such as three (3) inches. Furthermore, the foot rest of a reclined or flat seat may be deformable similar to the back of the seat discussed previously to further absorb crash energy.

The rotational control system and/or the translational control system may alternatively be activated as described above when impact is initially detected at a location of impact on the vehicle along a collision axis. The impact may be initially detected using sensors of the perception system 172 configured to detect changes in vehicle shape or pressure on the vehicle, such as pressure transducers in a door of the vehicle. The sensors may therefore be used to determine the location of impact and the collision axis. In response to detecting the impact, a seat may be rotated and/or translated to a position that reduces injury to a passenger in the seat, such as a most favorable orientation and/or a distance away from the location of impact.

Furthermore, passive systems, such as deformable material in the seat and pyro-actuated systems, may be used without determining a location of impact and/or a collision axis.

Figure 13:
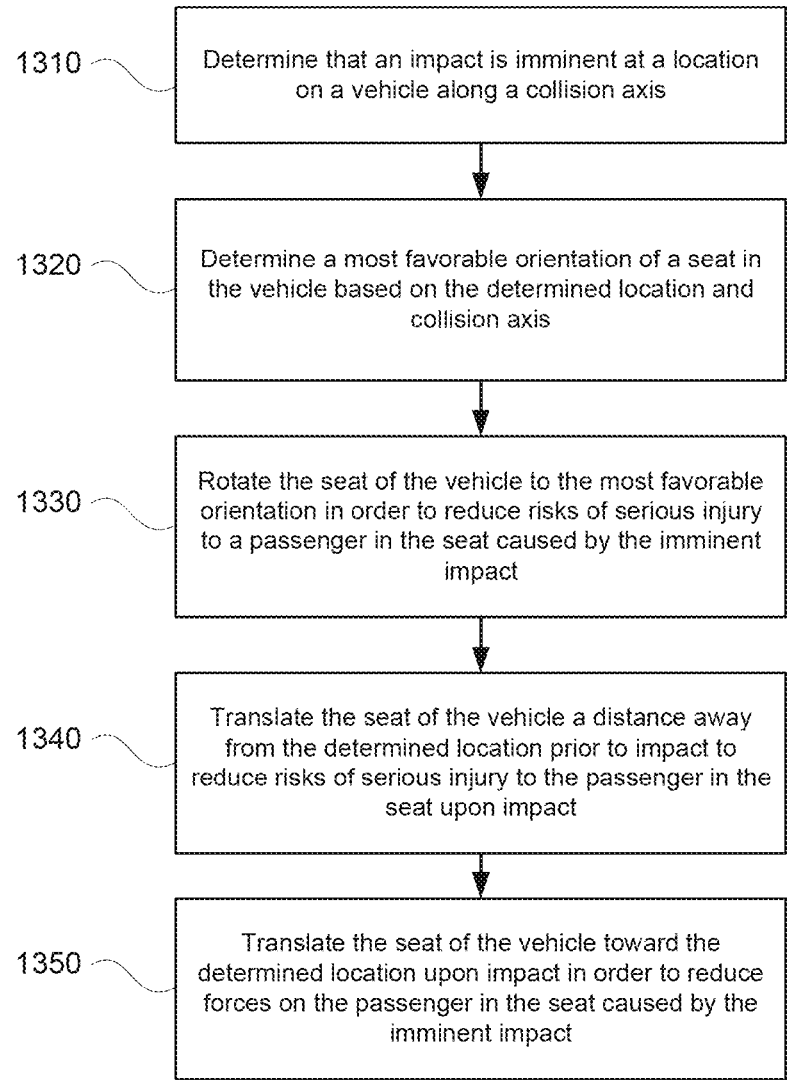
FIG. 13 is an example flow diagram in accordance with aspects of the disclosure.

FIG. 13 is an example flow diagram 1300 including a method for reducing likelihood of injury to a passenger in a collision, in accordance with some of the aspects described above. For example, at block 1310, a location on a vehicle where an imminent impact is likely to occur may be determined, as well as a collision axis along which the imminent impact is likely to travel may be determined. The location may be a particular side or door of the vehicle, and the collision axis may be based on a direction of impact.

Based on the determined location of impact and collision axis, a most favorable orientation of a seat in the vehicle may be determined at block 1320. The most favorable orientation of the seat may be where there is a least likelihood of injury to the passenger in the seat and/or at which personal restraint systems perform best. In some examples, the most favorable orientation of the seat may be determined as an angle to the collision axis, such as parallel to the collision axis with the back of the seat between the location of impact and a passenger in the seat.

At block 1330, the seat of the vehicle may be rotated to the most favorable orientation to reduce the risks of serious injury to a passenger in the seat upon impact. The rotation of the seat may be performed by a rotational control system that is activated by the vehicle's one or more computing devices. The seat may be rotated along one or more of the vertical axis, longitudinal axis, or lateral axis in order to protect the passenger in the seat from the primary and potential secondary impacts.

At block 1340, the seat of the vehicle may be translated a distance away from the determined location of impact prior to impact to further reduce the risks of serious injury to the passenger. The translation of the seat may be performed by a translational control system that is activated by the vehicle's one or more computing devices. The seat may also be translated away from other seats or objects in the vehicle to further reduce the risks of injury due to secondary impacts.

Upon impact, the seat may be translated toward the determined location upon impact in order to reduce acceleration forces on the passenger caused by the imminent impact at block 1350. Specifically, the translation toward the determined location may be at a controlled rate, or dampened. Means of energy dissipation or absorption may be used by the translation control system when activated by the vehicle's computing devices to achieve the reduction of acceleration forces on the passenger.

The features described above may provide for a system for moving seats in a vehicle to absorb crash energy in a collision. Should a collision occur, a passenger may be less seriously injured because he or she experienced less acceleration due to the impact and/or was moved away from the area where more serious injury would have likely occurred. Medical bills may be less expensive as a result, and potential liability to vehicle owners may be reduced. In addition, seating system may also experience less acceleration from the collision and therefore may require fewer repairs or otherwise be more likely to be usable after the collision. Because these features move seats into safer position before a collision, more untraditional seating arrangements may be used in vehicles.

Although the examples described herein are related to the use of vehicles when operating in autonomous driving modes, such features may also be useful for vehicles operating in manual or semi-autonomous modes or for vehicles having only manual driving mode and semi-autonomous driving modes. In such cases, an active or passive safety mechanism may be identified as discussed above. However, when making the determination as to whether to deploy the active or passive safety mechanism and/or control the vehicle as discussed above, the reaction time of the driver may be compared with the estimated time at which an impact with an object is expected to occur. Reaction times may be determined, for example, by monitoring a specific driver's reaction times over time or by using average or expected reaction times for drivers in general. If the reaction time is too slow, the vehicle's computing device may then use the estimated time when an update will be received to determine whether to deploy the active safety mechanism and, in the case of a vehicle with such capabilities to take control and maneuver the vehicle as discussed in the examples above.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
   determining, by one or more computing devices, that an impact is imminent at a location on a vehicle along a collision axis;
   positioning, by the one or more computing devices, a seat of the vehicle relative to the location and the collision axis in order to reduce risks of serious injury to a passenger in the seat upon the impact; and
   translating, by the one or more computing devices, the seat of the vehicle to reduce risks of serious injury to the passenger by sliding a base portion of the seat along a guide rail while using a fluid or a deformable material to absorb at least a portion of energy caused by the impact.

2. The method of claim 1, further comprising translating, by the one or more computing devices, the seat of the vehicle a distance away from the location prior to the impact to reduce risks of serious injury to the passenger in the seat upon the impact.

3. The method of claim 1, wherein the positioning includes rotating, by the one or more computing devices, the seat of the vehicle to a most favorable orientation prior to the impact, the most favorable orientation being an angle to the collision axis at which there is at least one of (i) a least likelihood of injury to the passenger in the seat or (ii) a highest performance of a personal restraint system.

4. The method of claim 3, further comprising determining, by the one or more computing devices, the most favorable orientation of the seat in the vehicle based on the location and the collision axis.

5. The method of claim 3, wherein the most favorable orientation of the seat is an angle that is parallel to the collision axis with a front of the seat facing away from the location.

6. The method of claim 1, wherein the translating of the seat of the vehicle allows the passenger in the seat to translate along the collision axis independent from the seat of the vehicle.

7. The method of claim 6, wherein the seat comprises the deformable material such that the passenger in the seat may translate during the impact independent from the seat.

8. A system comprising:
a translational control system including a guide rail along which a seat of a vehicle is configured to move; and
one or more computing devices having one or more processors configured to:
determine that an impact is imminent at a location on the vehicle along a collision axis;
position the seat of the vehicle relative to the location and the collision axis in order to reduce risks of serious injury to a passenger in the seat upon the impact; and
use a fluid or a deformable material to absorb at least a portion of energy caused by the impact while sliding a base portion of the seat along the guide rail.

9. The system of claim 8, wherein the one or more computing devices is further configured to translate, using the translational control system, the seat of the vehicle a distance away from the location prior to the impact to reduce risks of serious injury to the passenger in the seat upon the impact.

10. The system of claim 8, further comprising a rotational control system configured to translate the seat of the vehicle, wherein the one or more computing devices is configured to position, using the rotational control system, the seat of the vehicle to a most favorable orientation prior to the impact, the most favorable orientation being an angle to the collision axis at which there is at least one of (i) a least likelihood of injury to the passenger in the seat or (ii) a highest performance of a personal restraint system.

11. The system of claim 10, wherein the one or more computing devices is further configured to determine the most favorable orientation of the seat in the vehicle based on the location and the collision axis.

12. The system of claim 10, wherein the most favorable orientation of the seat is an angle that is parallel to the collision axis with a front of the seat facing away from the location.

13. The system of claim 8, wherein the seat of the vehicle is configured to allow the passenger in the seat to translate along the collision axis independent from the seat of the vehicle.

14. The system of claim 13, wherein the seat comprises the deformable material such that the passenger in the seat may translate during the impact independent from the seat.

15. The system of claim 8, wherein the system is comprised by the vehicle.

16. The system of claim 15, wherein the vehicle is capable of operating autonomously.

17. A non-transitory, computer-readable medium on which instructions are stored, the instructions, when executed by one or more computing devices, causing the one or more computing devices to perform a method, the method comprising:
determining that an impact is imminent at a location on a vehicle along a collision axis;
positioning a seat of the vehicle relative to the location and the collision axis in order to reduce risks of serious injury to a passenger in the seat upon the impact; and
using a fluid or a deformable material to absorb at least a portion of energy caused by the impact while sliding a base portion of the seat along a guide rail.

18. The medium of claim 17, wherein the method further comprises translating the seat of the vehicle a distance away from the location prior to the impact to reduce risks of serious injury to the passenger in the seat upon the impact.

19. The medium of claim 17, wherein the positioning includes rotating the seat of the vehicle to a most favorable orientation prior to the impact, the most favorable orientation being an angle to the collision axis at which there is at least one of (i) a least likelihood of injury to the passenger in the seat or (ii) a highest performance of a personal restraint system.

20. The medium of claim 19, wherein the method further comprises determining the most favorable orientation of the seat in the vehicle based on the location and the collision axis.

* * * * *